US005579874A

United States Patent [19]
Jeffries et al.

[11] Patent Number: 5,579,874
[45] Date of Patent: *Dec. 3, 1996

[54] ADJUSTABLE SPEED GAS SPRING

[75] Inventors: Mark S. Jeffries, Florence, S.C.; James B. Chamberlin, Charlotte, N.C.; Archie L. Evans, Aynor, S.C.

[73] Assignee: AVM, Inc., Marion, S.C.

[*] Notice: The term of this patent shall not extend beyond the expiration date of Pat. No. 5,460,251.

[21] Appl. No.: 546,611

[22] Filed: Oct. 23, 1995

Related U.S. Application Data

[63] Continuation-in-part of Ser. No. 467,847, Jun. 6, 1995, abandoned, which is a continuation of Ser. No. 305,205, Sep. 13, 1994, Pat. No. 5,460,251.

[51] Int. Cl.⁶ .................................................. F16F 9/50
[52] U.S. Cl. .................... 188/282; 188/319; 188/322.15; 267/64.11
[58] Field of Search ....................................... 188/281, 282, 188/274, 322.15, 317, 319; 267/64.11, 64.25

[56] References Cited

U.S. PATENT DOCUMENTS

| | | | |
|---|---|---|---|
| 4,438,833 | 3/1984 | Schafer | 188/322.15 X |
| 4,467,899 | 8/1984 | Molders et al. | 188/322.15 X |
| 4,796,871 | 1/1989 | Bauer et al. | 188/282 X |
| 5,460,251 | 10/1995 | Jefferies | 188/322.15 X |

FOREIGN PATENT DOCUMENTS 0198180 10/1986 European Pat. Off. .......... 188/322.15

*Primary Examiner*—Lee W. Young
*Attorney, Agent, or Firm*—McAndrews, Held & Malloy, Ltd.

[57] ABSTRACT

An adjustable speed gas spring primarily adapted for use as a part of a door closing mechanism. The gas spring includes a piston assembly which is disposed within an elongated fluid chamber and which upon relative rotation of the shaft with respect to the tubular body, permits the user to adjust the shaft extension velocity. The gas spring is fully functional in any shaft orientation.

21 Claims, 5 Drawing Sheets

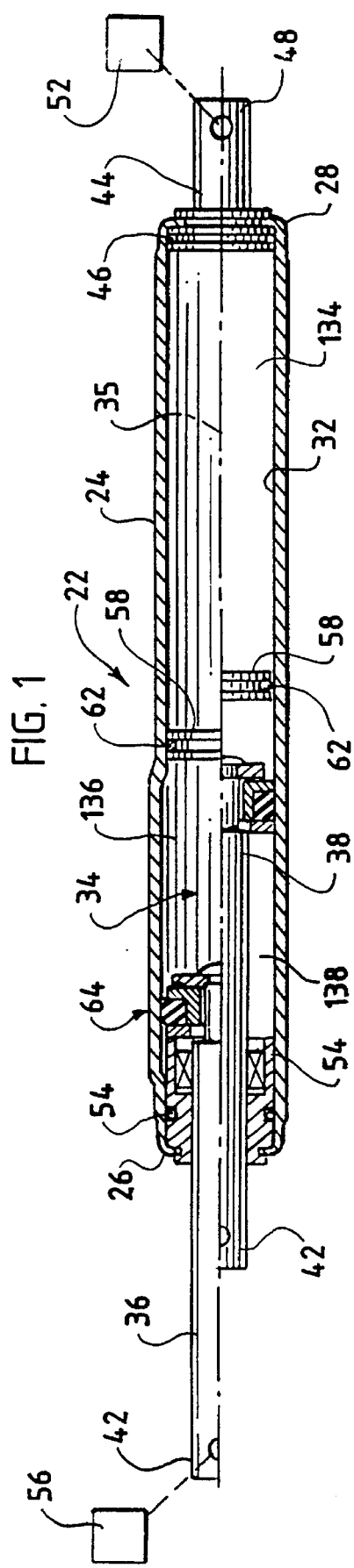
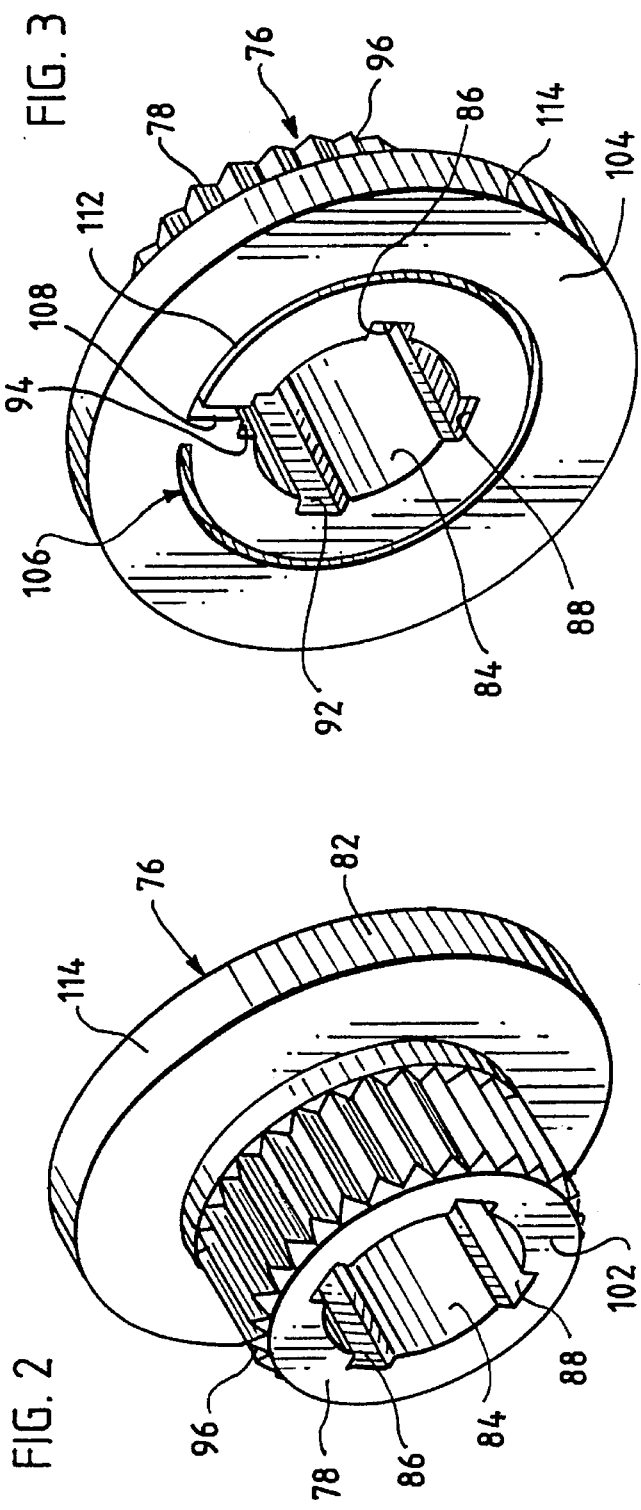

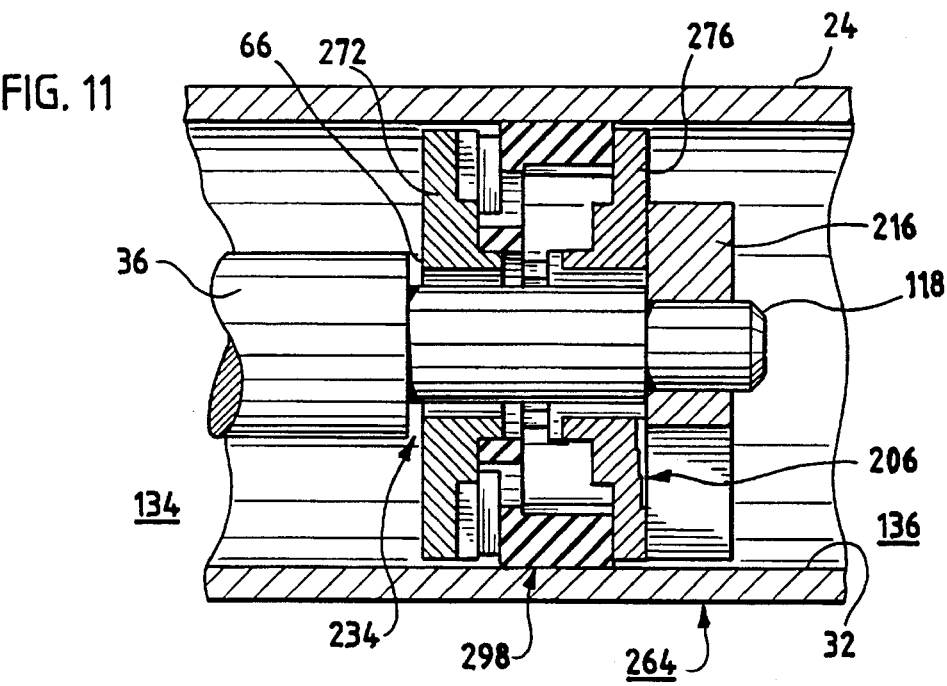
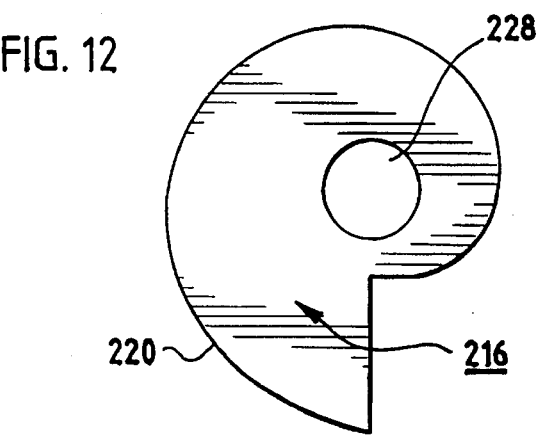
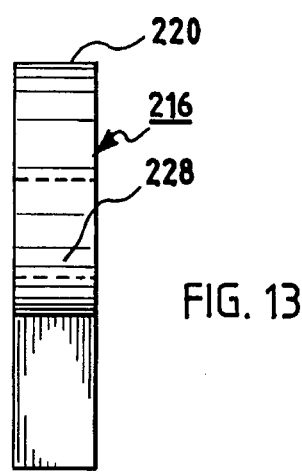
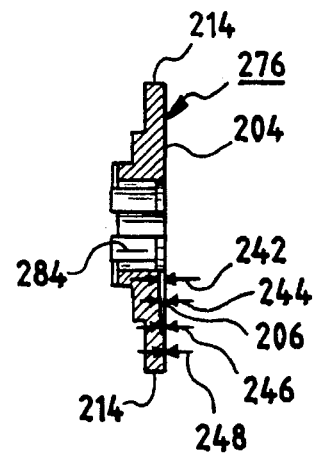

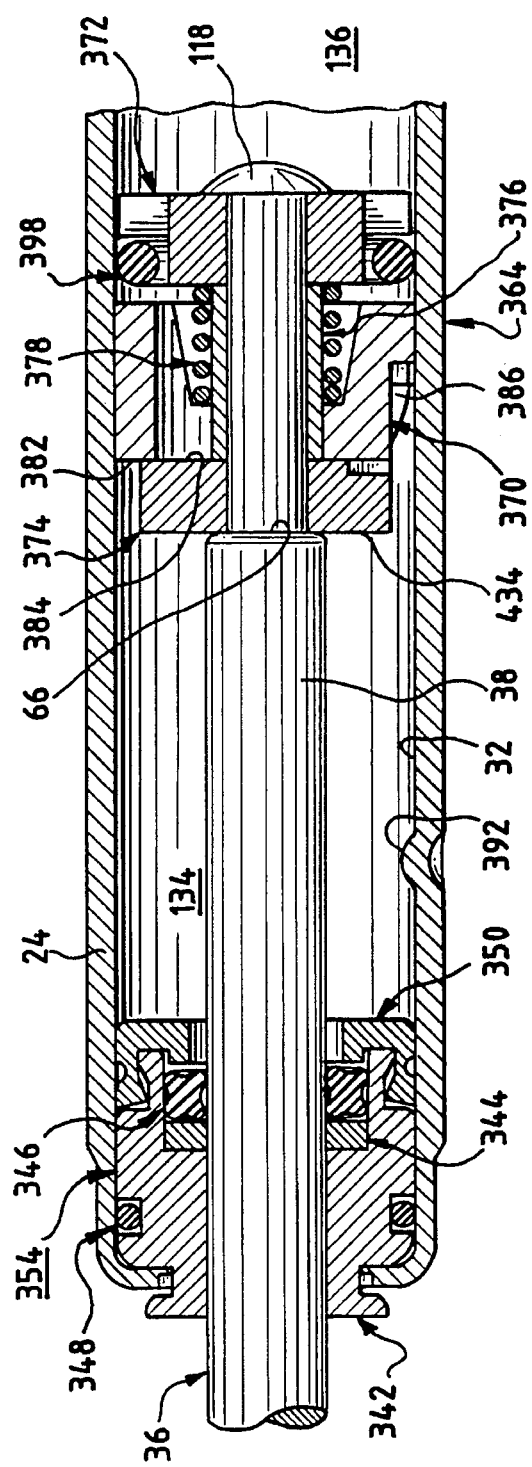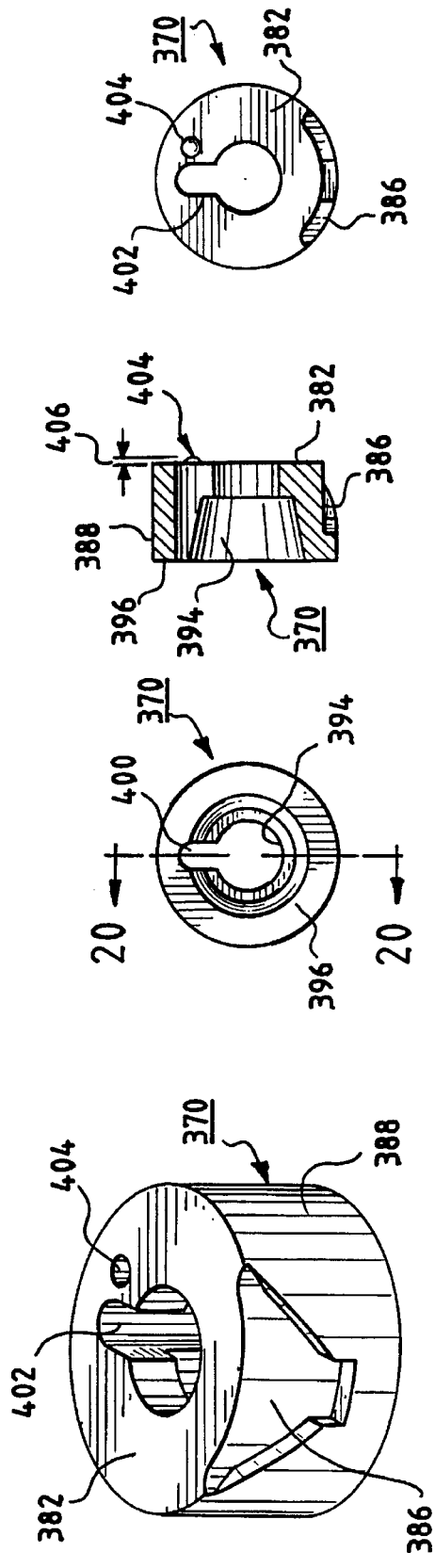

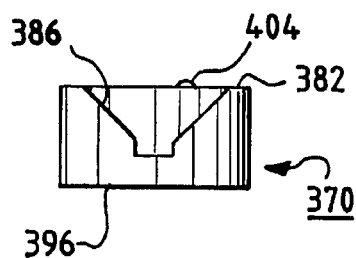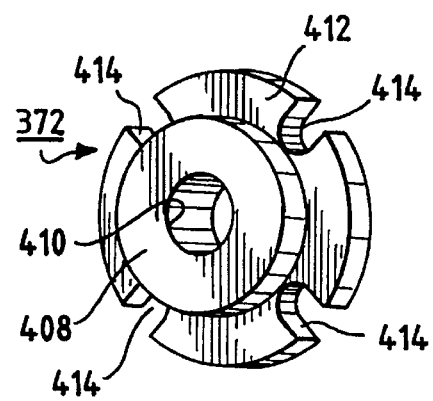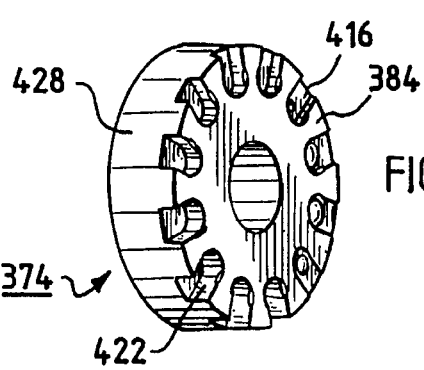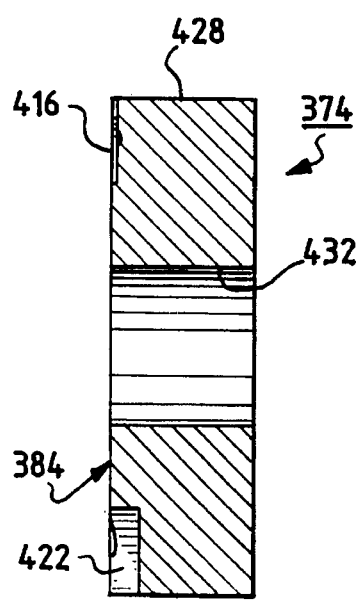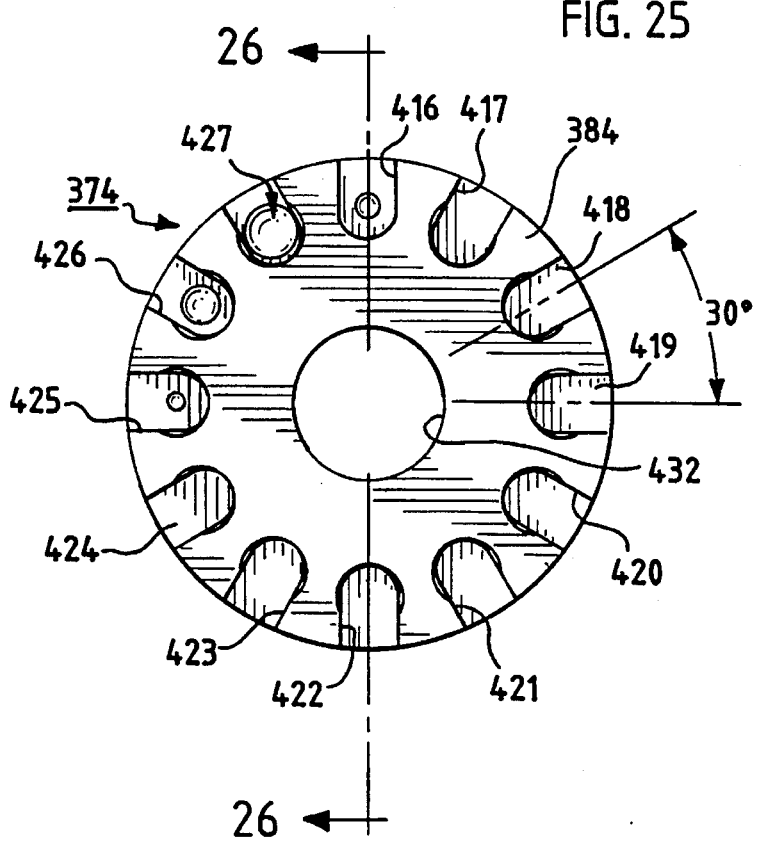

5,579,874

ADJUSTABLE SPEED GAS SPRING

RELATED APPLICATIONS

This application is a continuation-in-part application of pending U.S. patent application Ser. No. 08/467,847 filed Jun. 6, 1995, which, in turn, was a continuation of U.S. patent application Ser. No. 08/305,205, filed Sep. 13, 1994, now U.S. Pat. No. 5,460,251.

BACKGROUND OF THE INVENTION

The present invention relates to gas springs, and more particularly, to adjustable or variable speed gas springs that may have an adjustable extension or compression velocity and that are particularly suited for use as a part of a door closure mechanism where the spring extension or compression velocity determines the closing speed of the door.

In the past, adjustable speed gas springs of various constructions have been used for a variety of purposes including serving as parts of door closure mechanisms. The adjustment of the shaft extension or compression velocity or speed of the gas springs, which are used as parts of door closing mechanisms, has been achieved by rotating the spring shaft relative to its tubular body. Those working in this art have long sought to develop gas springs whose shaft extension or compression speed can be readily and easily adjusted while minimizing the cost of manufacturing the gas spring. Additionally, a further goal of those working in this art has been to develop an adjustable speed gas spring that will stand up to the forces imposed upon the spring during its usage such as when it is used as a part of a door closure mechanism, that can achieve a full range of speed adjustments within one revolution of the spring shaft relative to its tubular body, and that will be fully functional regardless of the particular orientation of the gas spring in its use environment.

SUMMARY OF THE INVENTION

In principal aspects, the improved variable speed gas spring of the present invention achieves the aforementioned goals of those working in the art. At a nominal output force of, for example, about 80 pounds, the improved gas spring of the present invention can be adjusted so as to have a shaft extension or compression velocity of between 1.5 inches per second to about 0.25 inches per second. In other words, this improved gas spring, having a 1.5 inch shaft extension stroke, can be adjusted so that full extension or compression is achieved as fast as one second or as slow as twelve seconds.

Such full adjustment of the shaft extension or compression velocity can be achieved by simply rotating the tubular body of the gas spring relatively about the axis of its shaft through one or less complete revolution and does not require the employment of any threaded parts in the gas springs piston assembly which obviously reduces the spring's manufacturing costs. Additionally, the improved adjustable speed gas spring of the present invention may employ a relatively inexpensive means for assuring that the spring's piston assembly remains properly aligned within the tubular body so as to assure that the gas spring may be repeatedly and predictably adjusted to the same shaft extension or compression velocities in a user friendly manner.

The improved gas spring of the present invention may also fully function in any orientation, (e.g., shaft up, shaft down, shaft horizontal, etc.). It includes structure that permits the gas spring to readily and easily be initially charged and its piston valve assembly may be self-cleaning—a significant benefit in hydraulic and/or pneumatic mechanisms. The manufacturing costs of the improved spring are further reduced by a design that allows for the use of a self-retaining shaft front end bushing and self-retaining end cap for the other end of the spring.

Accordingly, it is a principal object of the present invention to provide an improved adjustable speed gas spring, as described above, whose shaft extension or compression velocity may be readily, easily and predictably adjusted, time and time again, by rotating the spring shaft and tubular body relatively to each other. A related object of the present invention is to provide an improved adjustable speed gas spring of the type described where the full range of adjustments can be achieved within one or less complete relative revolution of the shaft and tubular body; and where the spring can be manufactured at a relatively low cost.

A further object of the present invention is to provide an improved adjustable speed gas spring of the type described where the gas spring is particularly adapted for assisting in the opening or closing a door in a building; where the gas spring's tubular body includes an inner wall that defines an elongated fluid chamber which has first and second normally closed ends, which has an elongated axis that extends between its ends, and which is filled with at least one pressurized fluid; where the first end of the spring's shaft extends into the first end of the fluid chamber so that the axis of the fluid chamber and the shaft are co-axial; where the gas spring includes an improved first piston assembly which permits the speed of the shaft, when moved in one axial direction, or if desired, in both axial directions, to be adjusted in that the speed may be increased or decreased, which is supported on and about the shaft, adjacent the first end of the shaft, and which serves to divide or separate the fluid chamber into a first, shaft-side sub-chamber and a second, middle sub-chamber; where first and second fluid flow paths are defined in the first piston assembly for permitting fluid to flow between the first and second sub-chambers, with the second flow path being closed when the first piston assembly moves in one axial direction and being open when the first piston assembly moves in the opposite axial direction; where the first piston assembly includes a first member which is mounted on the shaft, adjacent to the first end of the shaft, such that the first member moves reciprocally and rotationally with the reciprocal and rotational movement of the shaft and which includes a first side; where the first piston assembly also includes a second member which is mounted on the shaft, adjacent to the first member, which is adapted to move, in a limited manner, with respect to the first member and the shaft, and which includes a second side thereon that faces the first side of the first member, with the first and second sides being adapted to define therebetween an interim fluid flow path; and where the first and second members may be selectively rotated, with respect to each other, to selectively change the interim flow path so as to selectively increase or decrease the fluid pressure drop across (or in other words, the rate of fluid flow through) the interim flow path when the first piston assembly moves in the one axial direction. A related object of the present invention is to provide an improved adjustable speed gas spring of the type described where when the shaft and first piston assembly are moved in the one axial direction, the first and second sides are maintained adjacent to each other so as to define therebetween the interim flow path; and where when the shaft and first piston assembly are moved in the opposite axial direction, the second member is moved axially, with respect to the first member, so that a gap is created between the first and second sides and so as to non-define the interim flow path between the first and second sides.

A still further object of the present invention is to provide an improved adjustable speed gas spring of the type described where the interim flow path includes a groove in the second side of the second member; and where the first side of the first member includes means for changing the effective length of the groove depending on the selected relative rotational positions of the first and second sides. A related object of the present invention is to provide an improved gas spring of the type described where the groove extends radially outwardly from adjacent to the shaft and whose depth may be non-uniform along its length and can be configured to meet desired performance objectives by making it either greater or shallower adjacent to the peripheral side edge of the second member than adjacent to the shaft; and where the first side of the first member has a "seashell" or involute-like spiral profile that, upon relative rotation of the first and second members, the first side overlies more or less of the radial groove so as to increase or decrease the groove's effective length which will increase or decrease the pressure drop created across the sub-assembly and which will thus permit the speed of movement of the piston and rod assembly to be reduced or increased. A further related object of the present invention is to provide an improved gas spring of the type described where the interim flow path includes a radially disposed slot in the second side of the second member, with the slot extending from adjacent to the shaft to a point adjacent to but spaced from the side peripheral edge of the second member; where the first side of the first member has a plurality of radially aligned slots evenly spaced about its periphery, with each of the slots having a different flow area, that is, dimensions, so as to be able to accommodate different rates of fluid flow therethrough; and where one of the plurality of slots in the first side may be selectively aligned and brought into fluid communication with the slot in the second side so that fluid may flow through the two aligned slots.

Another object of the present invention is to provide an improved adjustable speed gas spring of the type described where a second or "floating" piston assembly is disposed in and is axially movable within the fluid chamber between the first piston assembly and the second end of the chamber; where the second piston assembly serves to define an end of the second, middle sub-chamber, which is between the two piston assemblies, and a third end sub-chamber which is between the second piston assembly and the second end of the fluid chamber; where the third end sub-chamber is filled with a second pressurized fluid, such as a gas, that is selectively pressurized to a predetermined pressure; where the second piston assembly includes at least one seal between it and the inner wall of the tubular body for preventing flow of the pressurized fluid therebetween; where the axial position of the second piston assembly in the fluid chamber is determined by the pressure of the second pressurized fluid in the third, end sub-chamber; and where the axial position of the second piston assembly determines the pressure of the pressurized fluid in the first, shaft-end and second, middle sub-chambers and thus the fluid pressure acting on the first end of the shaft.

These and other objects, advantages and benefits of the present invention will become apparent to those skilled in the art from the following description of the drawings and the preferred embodiment of the present invention.

DESCRIPTION OF THE DRAWINGS

FIG. 1 is a vertical cross-sectional view of a preferred embodiment of the adjustable speed gas spring of the present invention, with the shaft and the improved first piston assembly being shown, in the upper half of this FIGURE, in a shaft extended position, and with the shaft and piston assemblies being shown in the lower half of the FIGURE, in a shaft compression position;

FIG. 2 is a perspective view showing one side of a metering plate that is a component of the first piston assembly of the present invention;

FIG. 3 is another perspective view of the metering plate of FIG. 2 and showing the other side of the metering plate;

FIG. 11 is a vertical cross-sectional view of another improved first piston assembly;

FIG. 12 is side elevational view of the top plate of the piston assembly of FIG. 11;

FIG. 13 is a right side end view (with reference to FIG. 12 of the top plate shown in FIG. 12;

FIG. 14 is an end view, (of the end facing the top plate) of the metering plate of the piston assembly of FIG. 11;

FIG. 15 is a cross-sectional view taken along the line 15—15 in FIG. 14;

FIG. 16 is a vertical cross-sectional view of the piston seal of the piston assembly of FIG. 11;

FIG. 17 is an axial, cross-sectional view of still another improved first piston assembly shown positioned adjacent to the shaft end of the tubular body;

FIG. 18 is a perspective view of the sealing piston of the piston assembly of FIG. 17;

FIG. 19 is an end view of the sealing piston of FIG. 18;

FIG. 20 is a cross-sectional view taken along the line 20—20 of FIG. 19;

FIG. 21 is the other end view of the sealing piston of FIG. 18;

FIG. 22 is a side elevational view of the sealing piston of FIG. 18;

FIG. 23 is a perspective view of the washer of the piston assembly of FIG. 17;

FIG. 24 is a perspective view of the orifice plate of the piston assembly of FIG. 17;

FIG. 25 is an end view of the orifice plate of FIG. 24; and

FIG. 26 is a cross-sectional view taken along the line 26—26 in FIG. 25.

DETAILED DESCRIPTIONS OF THE PREFERRED EMBODIMENTS

Figure 4:
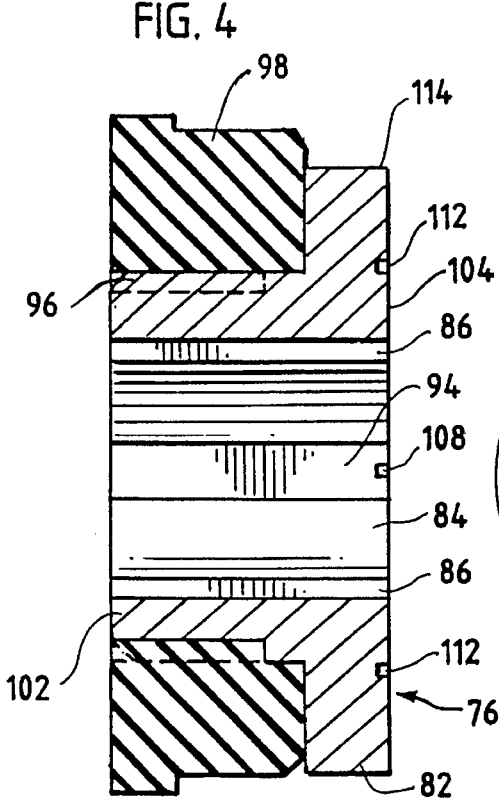
FIG. 4 is an axial, vertical cross-section of the metering plate shown in FIGS. 2 and 3, and a piston seal that is mounted on the metering plate.

Referring now to FIG. 1, a preferred embodiment of the improved adjustable speed gas spring of the present invention is shown generally at 22. It includes a tubular body 24 that has a first end 26, a second end 28, and a generally tubular inner wall 32. The latter serves to define an elongated fluid chamber 34 that extends between the ends 26 and 28 and that has a central longitudinal axis, shown generally at 35, extending between the ends.

The gas spring 22 also includes a machined shaft 36 having a first end 38 and a second end 42. The first end of the shaft is disposed within the fluid chamber 34 and is adapted to move reciprocally therein between a shaft extended position, shown on the upper half of FIG. 1, and a shaft retracted position, shown in the lower half of FIG. 1. The shaft has a central longitudinal axis which is coaxial with the longitudinal axis 35 of the fluid chamber 34.

The end 28 of the tubular body is closed by a self-retaining end cap 44. A conventional O-ring seal 46 is carried by the end cap 44 and serves to form a fluid tight seal between the end cap and the inner wall 32. The projecting end 48 of the end cap 44 is adapted to be connected in a conventional manner with, for example, a building, diagrammatically shown at 52, when the spring 22 is used as a part of an otherwise conventional door closure mechanism.

A self-retaining front bushing assembly 54 extends about the shaft, adjacent the end 26 of the tubular body 24. Bushing assembly 54 forms a fluid tight seal around the inner wall 32 and the outer periphery of the shaft 36 as it reciprocally moves within the tubular body 24.

The end 42 of the shaft 36 may be connected in a conventional manner with, for example, a door, shown diagrammatically at 56, when the gas spring 22 is used as a component of the door closure mechanism.

A floating piston assembly 58 is disposed in the fluid chamber 34 between the end cap 44 and the end 38 of the shaft 34. This assembly 58 includes a conventional O-ring seal 62 that serves to form a fluid tight seal between the outer periphery of the piston assembly 58 and the inner wall 32 of the tubular body 24. The floating piston assembly 58 may move within the fluid chamber 34 along and parallel to the axis 35 of that chamber in response to the differential fluid pressure acting on the assembly 58 as hereinafter more specifically described.

Referring now to FIGS. 1, 4, 7 and 8, a piston assembly 64 is supported on the shaft 36 adjacent to its end 38. More particularly, a shoulder 66 is formed adjacent the end 38, and the assembly 64 is disposed between the reduced diameter portion 68 between this shoulder and the distal end 38 of the shaft.

The assembly 64 comprises a conventional "floating" washer 72 that includes a central aperture 74 through which the reduced diameter portion 68 of the shaft 36 extends. The aperture 74 is sized and shaped such that fluid may readily flow through it and between the washer 72 and the shoulder 66 but such that the washer 72 cannot pass beyond or over the shoulder 66, that is, to the left of the shoulder as shown in FIG. 1. The outer diameter of the washer 72 is substantially the same as but less than the diameter of inner wall 32 so that the washer can move axially, along with the shaft, without contacting the inner wall.

As best illustrated in FIGS. 2–4, a metering plate 76 is supported on the reduced diameter portion 68 of the shaft 36 adjacent to the floating washer 72. The metering plate 76 includes a reduced diameter portion 78 and a larger diameter portion 82. The metering plate 76 also has a central, axial opening 84 extending therethrough the diameter of the opening 84 is substantially the same but slightly larger than the diameter of the portion 68 of the shaft 36 so that the plate 76 can move along and relative to the portion 68. The opening includes four axial, radially outwardly extending, internal flow channels or passages 86, 88, 92 and 94. These passages 86–94 are equi-spaced about the longitudinal or axial axis of the opening 84 and permit fluid to freely pass through the plate as hereinafter more specifically described.

The radially outwardly facing surface of the reduced diameter portion 78 of the metering plate 76 includes a plurality of axially extending ribs or grooves 96. These grooves 96 cooperate with an annular piston seal 98, shown in FIGS. 4, 7, 8, 9 and 10 so that a mechanically intimate and fluid tight seal will be provided between that surface of the portion 78 and the annular seal 98. The inner diameter of the annular seal 98 is ribbed such that it tightly fits on the inner portion 78 of the metering plate 76 so that the seal 98 and the plate move together.

The radially outwardly facing surface of the annular seal 98 forms a fluid tight seal between that surface and the inner wall 32 of the tubular body 24. The outer diameter of the annular piston seal is selected such that it has an interference fit with the inner wall 32. This interference fit momentarily prevents or retards movement of the seal 98, and thus the metering plate 76, with the shaft 36 when the shaft initially begins to move within the chamber 34.

The metering plate 76 further includes a first side 102 that is on the portion 78 and a second side 104 that is on the portion 82. These sides 102 and 104 are substantially parallel to each other and perpendicular to the axis of the shaft when the metering plate is mounted on or supported by the shaft. Side 102 faces and is adjacent to the washer 72. It normally abuts the washer. Side 104 faces toward the end 28 of the tubular body 24 and the end 38 of the shaft 36.

Side 104 has a generally G-shaped groove 106 formed therein. A first portion 108 of the groove 106 is in fluid communication with and extends radially outwardly from the end of the passage 94 which is adjacent to the side 104. The groove 106 also includes a generally arc-like or semi-annular portion 112 that extends about the axis of the central opening 84 through an arc of slightly less than 360°. One end of the portion 112 intersects and is in fluid communication with the radially outward end of the portion 108, and its other end is spaced a short distance from the radially outward end of the portion 108. The portion 112 is disposed radially inwardly a pre-selected distance from the radially outer peripheral edge 114 of the side 104.

The piston assembly 64 also includes a top plate 116. It is attached to the end 38, that is, the distal end of the portion 68 of the shaft 36, by a rivet or similar fastener 118 such that the plate 116 cannot move, either axially or rotationally relative to the shaft 36.

Figure 5:
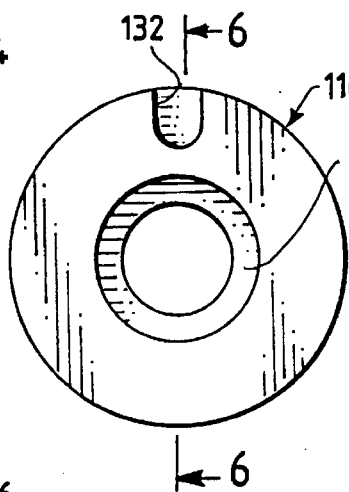
FIG. 5 is an end view of the top plate that is a component of the first piston assembly of the present invention.
Figure 6:
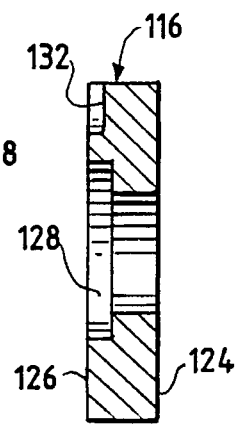
FIG. 6 is a cross-sectional view taken along the line 6—6 of FIG. 5.

As best shown in FIGS. 5 and 6, the top plate 116 has a first side 124 and a second side 126. Side 124 faces the end 28 of the tubular body 24 and is abutted by the head of the rivet 118. Side 126 faces and is substantially parallel to the side 104 of the plate 76. Side 126 includes a central cut-back portion 128 that surrounds a central aperture through which the rivet 118 extends. Side 126 also includes a cut-out 132 that extends radially inwardly a pre-selected distance from the peripheral edge of the plate 116. The circumferential "width" of the cut-out 132 is relatively short and the radial length of the cut-out is selected, as described below, to permit its radially inner end to overlie the groove portion 112.

The axial length of the metering plate 76, including its seal 98, is selected such that this length is slightly less than the distance between the floating washer 72 and the side 126 of the top plate 116. Thus the sides 104 of the plate 76 and the side 126 of the plate 116 can be spaced apart such that a gap, indicated generally at 133 in FIG. 8, can exist between sides 104 and 126.

When the side 126 of the plate 116 is brought into surface-to-surface contact with the side 104, the side 126 overlies or covers the groove 106. As noted above, the cut-out 132 extends radially inwardly, from the peripheral edge of the plate 116, a sufficient distance so that its radially inner end overlies the portion 112 of the groove 106. By rotating the plate 76, with respect to the shaft 36 and thus the plate 116, the point or position where the cut-out overlies the portion 112 can be varied or adjusted.

More particularly, the passages 86, 88, 92 and 94, the cutback portion 128, the groove 106 and the cut-out 132 define a flow path for fluid passing from one side of the piston assembly 64 to the other. The length of this flow path, and particularly the length of the interim part of this flow path defined by the groove 106 (that is, the portions 108 and 112) and cut-out 132, can be varied by changing the point or position where the cut-out 132 overlies the portion 112 of the groove 106. By varying the length of this interim flow path, the pressure drop or differential that is created across the groove is changed as is the time required to pass fluid through that flow path. As more specifically explained hereinbelow, the pressure differential across or the rate of flow through this flow path controls the rate at which the piston assembly 64, and thus the shaft 36, may be extended out with respect to the body 24. In other words, the variation of the length of the interim flow path, i.e., the pressure differential and the configuration of the groove, determines the shaft extension speed or velocity, and by varying this flow path length and groove configuration, the speed or velocity can be adjusted accordingly.

In manufacturing the spring 22, the tubular body 24 is turned down on both ends 26 and 28 for crimping. The floating piston 58 is inserted into the fluid chamber 34 and a hydraulic fluid, for example oil, is then injected into the fluid chamber through the end 26 until the chamber is almost fully filled. At this time, the piston 58 is located adjacent the end 28 of the tubular body 24.

The components of the piston assembly 64 are then mounted onto the reduced diameter portion 68 of the shaft 34. More specifically, the washer 72 is placed on the shaft 36 adjacent to the shoulder 66. The metering plate 76 and annular seal 98 are then inserted onto the shaft so that the plate's side 102 is adjacent to the washer 72 and so that the plates' side 104 is adjacent to the side 126 of the plate 116. The top plate 116 is next riveted on the end 38 of the shaft, by rivet 118, such that its side 124 faces the rivet head. The bushing assembly 54 is installed onto the shaft 36. The piston assembly 64, the bushing assembly 54, and shaft 36 are then inserted into the fluid chamber 34 through the end 26 of the body 22. The end 26 is then crimped and interlocked into the bushing 54. At this point in its manufacture, the spring 22 is partially completed but is uncharged and non-functional.

Next, using a conventional gas charging system, the portion of the fluid chamber 34 between the floating piston 58 and the end 28 of the tubular body 24 (that is, in an end sub-chamber 134, as shown in FIG. 1) is pressurized with a pressurized fluid such as nitrogen. The end cap 44 then driven into the end 28 and the end is crimped into an undercut in the end cap. The spring 22 is now functional and ready for testing and use.

In the resting state of the spring 22, the shaft 36 is fully extended out of the tubular body 24. The nitrogen in the end sub-chamber 134 of the chamber 34 is sealed between the end cap 44 and the piston 58. This gaseous pressure pushes on the piston 58 thereby imparting a force against the piston directed toward the end 26. This force against the piston 58, in turn, pressurizes the fluid in the fluid chamber between the end 26 and the piston 58 (that is, in a shaft-side sub-chamber 136 and a middle sub-chamber 138, as shown in FIG. 1). Because the piston assembly 64 does not create a fluid seal between the sub-chambers 136 and 138, the pressure of the fluid therein (that is, on both sides of the assembly 64) is the same. The seal assembly 54 and more importantly the shaft 36 thus "sees" a differential pressure that is, a high pressure fluid on the projected surface of its end 38 and an atmospheric pressure on its projected end surface 42. It is this pressure differential which causes the shaft to move to its extended position in its resting state. This is one of the significant, advantageous features of the spring 22. In other words, because the gas pressure acts indirectly on the shaft 36, the spring 22 will function the same way regardless of the shaft's orientation.

Figure 8:
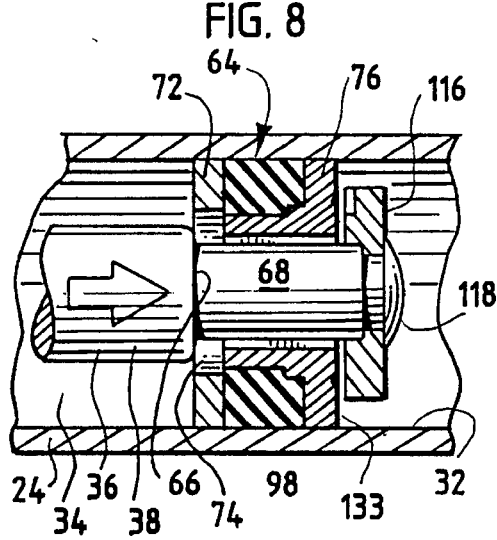
FIG. 8 is a partial, axial, cross-sectional view, similar to FIG. 7 of the first piston assembly with its component being shown in the position in which they are disposed when the shaft is moved in a shaft compression position.

Referring now to FIG. 8, when a sufficient axial force is applied to the shaft 36, it begins to move inwardly into the chamber 34, that is, in a shaft compression direction. Because an interference fit exists between the annular seal 98 and the inner wall 32, both the seal and the metering plate 76 momentarily remain stationary during initial inward movement of the shaft, that is, movement of the shaft to the right as shown in FIG. 1. Because it is riveted to the end of the shaft 36, the top plate 116, however, moves instantly with the shaft. Thus there is initial relative movement between the top plate 116 and the metering plate 76, and this relative movement creates a gap, as indicated at 133, between the two facing sides 104 and 126 of these two plates. This gap 133 allows fluid to transfer from the middle sub-chamber 136 to the shaft-side sub-chamber 138 through the passages 86–94, which constitutes a flow path, as the shaft continues its movement in a shaft compression or inward direction.

Because the washer 72 abuts and moves with the shoulder 66, the entire piston assembly 64 begins moving once the side 102 of the metering plate 76 is contacted by the washer. The washer 72 also keeps the annular seal 98 from being forced off the portion 78 of the metering plate 76. Thus, the shaft 36 continues moving in the shaft compression direction, as illustrated in FIG. 8. Fluid is not required to flow through the G-groove 106 and can, accordingly, another, a second flow path, permitting flow without restriction across the piston assembly 64, is created.

Figure 7:
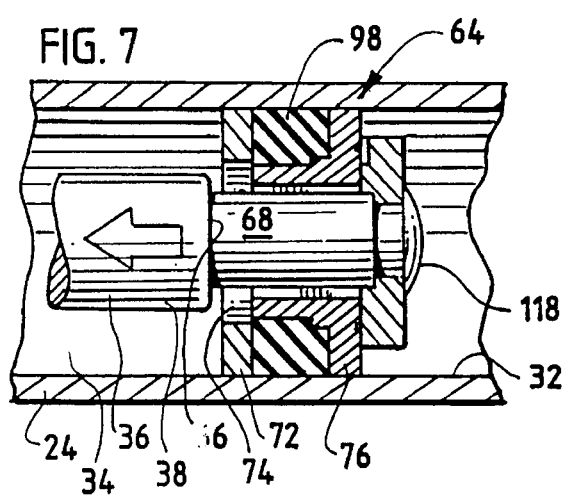
FIG. 7 is a partial, axial, vertical cross sectional view of the first piston assembly, with its components being shown in the position in which they are disposed when the shaft is moved in a shaft extension direction.

When sufficient axial force is applied to the shaft 36 by internal fluid pressure, the shaft moves in a shaft extension direction (that is, to the left in FIG. 1). The friction of the annular seal 98 against the inner wall 32 of the tubular body 24 causes the metering plate 76 to momentarily remain stationary during initial outward movement of the shaft, that is movement of the shaft to the left as shown in FIG. 1. Because it is riveted to the shaft 36, the top plate 116, however, moves instantly with the shaft. Thus there is initial relative movement between the top plate 116 and the metering plate 76, and this relative movement eliminates the gap, as indicated at 133, between the two facing sides 104 and 126 of these two plates when the side 126 of the top plate 116 contacts the side 104 of the metering plate 76 as best shown in FIG. 7. Differential fluid pressure across the seal 98 holds the top plate rigid and tightly against the metering plate so that sides 104 and 126 remain in surface-to-surface contact. As the shaft 36 tries to extend, the passage of fluid from the shaft-side sub-chamber 138 to the middle sub-chamber 136 is restricted because a gap between the plates 76 and 116, such as the gap 133, no longer exists. Accordingly, the only means by which fluid may pass across the piston assembly 64 is through the flow path comprising the passages 86, 88, 92 and 94, the portion 128, and the interim flow path, that is, the G-groove 106 and the cut-out 132.

The alignment of the G-groove 106, and more particularly the portion 112 of this G-groove, with the cut-out 132, determines the effective length of the interim flow path and how fast fluid can meter through this flow path. This consequently determines the pressure differential and thus how fast the shaft 36 can extend. For instance, if the cut-out 132 is aligned with the G-groove portion 112 adjacent to the juncture between its portions 108 and 112, the length of the flow path through the G-groove 106 will be at its minimum, and the corresponding shaft extension rate or speed will be at its maximum. As the metering plate 76 is rotated relative to the top plate 116, the cut-out 132 is moved relatively around the G-groove portion 112 causing a gradual increase in the flow path's length. By the time that the relative rotation of the top plate and metering plate is almost 360°, the cut-out 132 is aligned with the distal end of the G-groove portion 112, that is, the end of the portion 112 furthest from the junction between the portions 108 and 112. At this point, the length flow path will be at its maximum, and the corresponding shaft extension time will be the slowest. If the plates 76 and 116 are rotated a bit further, relative to one another in the same direction as above, the cut-out 132 will "cross-over" from the distal end of the G-groove to the juncture between the portion 108 and 112, and the shaft extension time will go from its slowest time back to its fastest time.

Figure 9:
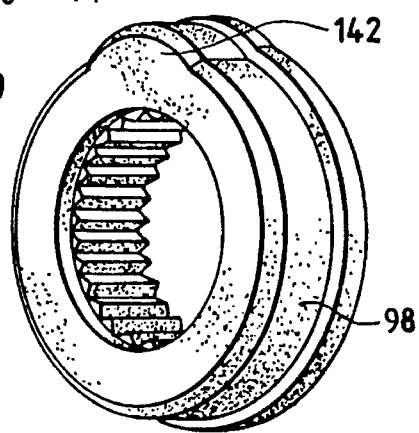
FIG. 9 is a perspective view of the piston seal.
Figure 10:
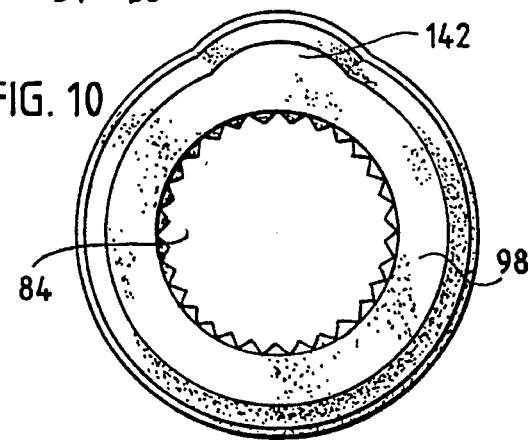
FIG. 10 is a second chamber-side end view of the metering plate and the shaft seal shown in FIG. 9.

To assure that the metering plate 76 can not rotate relative to the body 24, the seal 98 may be made as best shown in FIGS. 9 and 10. Specifically, a smooth, radially outwardly projecting bump 142 is formed on and along the peripheral edge of the radially outer surface of the seal 98. A correspondingly shaped, axially extending bump-like groove is likewise formed in the inner wall 32 of the tubular body 24. The bump-like 142 is disposed in and is adapted to slide axially along this corresponding bump groove in the inner wall. The interfitting of the bump 142 and the corresponding bump-like groove assures against relative rotation between the metering plate and the inner wall but does not prevent nor retard axial sliding moving therebetween.

As will be recognized by those skilled in this art, changes may, of course, be made to the above described preferred embodiment of the invention. For example, the G-groove 106 can vary in size, diameter and depth. The cross-sectional area of the groove 106 could be rounded, triangular, rectangular or any other suitable shape. Also, the groove 106 need not be "G" shaped but could have more bends and a greater length for higher pressure differentials. The groove 106 could be in the side 126 of the top plate 116 and cut-out 132 in the side 104 of the metering plate 76.

Moreover the plate 76 could be molded, casted (e.g., in zinc) or machined. It and the seal 98 could be made as a single rubber or plastic piece. By changing the durometer of such a plate which is made of, for example, rubber, the differential pressure acting across the plate could press the groove 106 into the side 126 of the metal top plate 116 and deform the groove 106. In such a situation, high differential pressures would cause a restriction in the cross-sectional area of the groove. This would, in turn, cause the extension speed of the piston assembly 64 to slow down (or even stop) until the differential pressure is reduced enough to allow the groove 106 to again be enlarged enough to allow normal (designed) fluid flow through the groove. The same effect could also be achieved by using a metal plate 76, with the groove 106 formed in its side 104, and by making at least the side 126 of the plate 116 from a rubber or plastic material. This side 126 would still have the cut-out 132, but would also be allowed, under the influence of high pressure differentials, to partially "squeeze" into the groove 106, thereby reducing its cross-sectional area and slowing down the piston assembly's extension time, when high pressure differentials exist. Further, the cooperating metering plate 76 and top plate 116 could be mounted on the other end (the left end as shown in FIGS. 7 and 8) of the piston assembly 64 with the washer 76 being mounted next to the rivet 118, so that the compression speed, instead of the extension speed of the assembly 64 and shaft 36 can be adjusted.

The piston assembly 64 may comprise more or fewer parts but achieve the same overall function. As noted, the metering plate 76 and the piston seal 98 could be incorporated into a single part made of plastic, rubber or the like. Similarly, the front bushing assembly 54 can incorporate a number of different seal types, such as shown in FIG. 17.

Further, the top plate 116 may have a counterbore that is formed in its side 126 adjacent to its central axis and that serves to also permit fluid communication between the left ends (as shown in FIGS. 7 and 8) of the channel 86–92 and the radially inner end of the portion 108 of the G-groove 106. The cut-out 132 could be replaced with a hole extending through the plate 116.

Additionally, the bump 142 on the piston seal 98, and the correspondingly shaped bump-like groove in the tubular body 24, do not have the shape as shown in FIGS. 9 and 10. The shape of the bump, and its corresponding groove, could be rectangular, triangular or any other shape can be swaged into the body 24 and matched on the periphery of the seal 98. The bump 142 could be inverted, that is, could be an inwardly protrudingly swaged protrusion on the body 24, and the seal 98 could then have a correspondingly shaped groove in its periphery. The bump and groove could even be "flat", that is, matching flatten sections, on the body and on the seal.

Further, the gas spring 22 could be used without the second "floating" piston assembly 58 or by replacing the assembly 58 with a diaphragm. The diaphragm may eliminate the added hysteresis caused by the assembly 58 while maintaining absolute separation of the fluids in the sub-chamber 134 and the remainder of the chamber 34 (that is, sub-chambers 136 and 138). When no assembly 58 (or diaphragm) is used, and the orientation of the gas spring 22 is slightly shaft down, the spring 22 can be designed so that the piston assembly 64 always will remain in fluid. Where the use of the spring 22 will be horizontal, the fluid will reside on either side of the assembly 64 when the assembly is in its compressed position within the body 24. The extension stroke will be partially composed of metering through gas and partially composed of metering through fluid. The last portion of the extension stroke will be through fluid as the last remaining portion of fluid in front of the piston assembly 64 will be forced to pass through the assembly. In this regard, the last portion of the extension travel will emulate that of a conventional gas spring extension stroke, that is, faster extension through gas, then slower extension through hydraulic fluid such as oil. Of course, the rates of extension through each medium, that is gas and oil, would be controlled by the position of the piston assembly components. The gas spring 22 could also be used in a vertical position, mounted on a door jamb, and connected to the door by means of a mechanical linkage that would convert the vertical extending motion of the gas spring shaft into a rotational motion that provides a door closing force to the door.

Referring now to FIGS. 11–16, another embodiment of the first piston assembly is shown generally at 264. Except as hereinafter described, the assembly 264 is structurally and functionally similar to assembly 64 hereinabove described. The principal difference between the assemblies 264 and 64 is in the way that the flow through the interim flow path is adjustably controlled. In assembly 64, metering plate 76 has a G-shaped groove 106 in its side 104 and a cut-out 132, which is on the face 126 of the top plate 116, cooperates with that groove to adjust the flow through the groove, or more particularly, the pressure drop affected across the groove. In contrast, the metering plate 276 in assembly 264, includes a groove 206 which extends radially outwardly from the opening 284 toward the side peripheral edge 214 of the side 204. This groove 206 can have a non-uniform depth throughout its length. For example, the depth of the groove 206 may decrease, in incremental steps, from its depth adjacent the opening 284 to its depth adjacent its radial outer end. Specifically, its depth can decrease in four steps; being 0.012 inches in the area indicated by the reference number 242, on FIG. 15 (that is, adjacent the opening 284), being 0.010 inches in the area indicated by the reference number 244, being 0.008 inches in the area indicated by the reference number 246, and being 0.006 inches in the area indicated by the reference number 248 (that is, adjacent radial outer end).

The outer peripheral side 220 of the top plate 216 of the assembly 264 has a shell-like or involute-like curved surface. This surface is designed such that more or less of the groove 206 will be covered by the top plate 216 depending on the relative rotational positions of the plates 216 and 276.

The washer 272 may have a structure such as described with respect to washer 72 or alternatively, may have the same general structure as the plate 276 except that no groove 206 would be required therein.

The piston seal 298 is shown generally in FIGS. 11 and 16 and includes a plate-like body member 292 and a plurality of axially projecting resilient pads 294 that are secured adjacent to the peripheral edge of the member 292.

When the shaft 36, on which the assembly 264 is mounted, is moved in a compression direction (that is, to the right as shown in FIG. 11) a gap is created between the face 204 of the plate 276 and the face 226 of the top plate 216. (A gap is not shown in FIG. 11 but the spacing for the gap is indicated generally by the numeral 234.) When such shaft 36 and piston assembly 264 movement occurs, the pressure differential acting on the piston seal 298 causes deflection of the pads 294 toward the washer 272. This flexure allows face 204 of the plate 276 to move away from the face 226 of top plate 216, creating the gap 234 therebetween which allows unrestricted fluid flow from the sub-chamber 136 to the sub-chamber 138.

When the shaft 36, and thus the assembly 264, is moved in a shaft extending direction (that is, to the left as shown in FIG. 11), the side 226 of the plate 216 is moved into surface-to-surface contact with the side 204 of the plate 214. The pressure differential across the groove 206 is generally such that, in this situation, the piston seal 298 is urged into tight sealing engagement with the tubular inner wall 32 of the tubular body 24.

Still another embodiment of the first piston assembly is shown generally at 364 in FIGS. 17–26. The assembly 364 generally cooperates with and functions in the gas spring 22 like the assemblies 64 and 264 but includes different component parts. Also the assembly 364 functions to adjust the speed of the shaft 36 during its compression stroke as opposed to its extension stroke.

More specifically, the assembly 364 includes a spring biased sealing piston 370 (best shown in FIGS. 17–22), a washer 372 (best shown in FIGS. 17 and 23), an orifice plate 374 (best shown in FIGS. 17 and 24–26), an O-ring seal 398, and an annular spacer sleeve 376. The orifice plate 374, washer 372, and sleeve 376 are mounted on the end 66 of the shaft 36 so that they do not move, either rotationally or axially, with respect to the shaft 36. As shown in FIG. 17, the orifice plate 374 abuts against the shoulder 66 on the shaft 36, the washer 372 is secured by the rivet 118, and the sleeve 376 extends between the plate 374 and the washer 372.

The sealing piston 370 is disposed about the sleeve 376 and between the washer 372 and the plate 374 and is designed to be able to rotate with the tubular body 24 and relative to the other components of the assembly 364. The length of the piston 370 is less than the length of the sleeve 376. A coil compression spring 378 is disposed about the sleeve 376 and between the washer 372 and the piston 370. The piston has a side 382 which is generally perpendicular to the axis of the shaft 36, facing the plate 374. The spring 378 biases the piston 370 away from the washer 372 so that a portion of the side 382 tightly abuts against and is in surface to surface contact with the facing side 384 of the orifice plate 374. Like with the assemblies 64 and 264, relative rotation between the piston 370 and the orifice plate 374 results in changes in the interim flow path that is defined between the sides 382 and 384 thereby increasing or decreasing the pressure drop across the assembly 364 when the shaft 36 and the assembly 364 are moved in the compression stroke direction (that is, to the right as shown in FIG. 17).

The sealing piston 370 also includes an outer peripheral wall 388 whose radius is substantially the same, but slightly less than the radius of the wall 32 of the body 24. A tapered notch 386 is included in the side 382 and the wall 388. This notch 386 is designed to cooperate with a radially inwardly directed "button" portion 392 on the inner wall 32 of the body 24. As best shown in FIG. 17, the button portion 392 is located adjacent the end seal 54. Accordingly, when the assembly 364 and the shaft 36 are moved so that the button 392 is within and can be engaged by the notch 386, a rotation of the body 24 will result in a corresponding rotation of the piston 370.

As best illustrated in FIGS. 18–22, the sealing piston 370 is generally annular shape and has a central aperture 394. The other side 396 of the piston 370 faces the washer 372 and includes a slot 400 to facilitate fluid flow through the central aperture 394 of the piston. The portion of the wall defining the aperture 394 includes a shoulder for receiving one end of the spring 378.

The side 382 of the piston 370 also includes a slot 402 which extends from aperture 394 radially outwardly, toward the peripheral side wall 388, a predetermined distance. A protrusion 404 is casted or formed on the side 382 and is angularly spaced (e.g. 30°) from the slot 402. The generally spherical shaped periphery of the protrusion 404 projects slightly outwardly from the plane of the side 382 a short distance as generally indicated at 406 and as hereinafter explained, serves as a detent.

As best illustrated in FIG. 23, the washer 372 has an integral, annular shoulder 408, which projects toward the side 396 of the piston 370, and a central aperture 410, which receives the shaft 36. The body 412 of the washer 372 has a plurality (four being shown) of radially directed cut-outs 414 which extend from the outer peripheral shoulder 408 to the outer peripheral edge of the body 412.

The O-ring seal 398 is positioned about the shoulder 408 of the washer 372. When the shaft 36 and assembly 396 are moved in a shaft extension direction (that is, when the shaft is moved to the left in FIG. 17), the O-ring seal 398, during the initial movement of the shaft, will remain momentarily stationary in the space between the side 396 of the piston 370 and the body 412 so that fluid can freely flow between the periphery of the piston 370 and the inner wall tube 32. When the shaft 36 and assembly 364 are moved in the opposite axial or compression direction (that is, when the shaft is moved to the right in FIG. 17), the friction of O-ring 398 against the inner wall 32 causes the O-ring to remain momentarily stationary during the initial movement of the shaft, which will then cause O-ring seal 398 to be urged against the surface 396 of the sealing piston 370 and thereby prevent flow of fluid between the periphery of 370 and inner wall 32, thereby forcing the fluid to travel through the metering system to move from fluid chamber 136 to fluid chamber 138.

With reference now to FIGS. 24–26, the side 384 of the orifice plate 374 includes a plurality of cut-out portions or slots, twelve of which are shown at 416–427. These slots 416–427 are evenly spaced about the central axis of the plate every 30° like the hour markings on the face of a clock. Each of the slots 416–427 extends radially inwardly from the outer peripheral wall 428 of the plate 374 towards the central axial aperture 432 in the plate 374, which receives the shaft 36. The radially inward ends of the slots 416–427 do not, however, communicate with the aperture 432 but stop a preselected distance from the radially outward edge of that aperture. More particularly, the radial length of the slots 416–427 are selected so that their radial inner ends will overlap with the radial outer end of the slot 402 in the side 382 of the sealing piston 370 so that when one of these slots 416–427 is aligned with the slot 402, fluid will flow through the interim flow path defined by the slot 402 and the aligned one of the slots 416–427 from the central longitudinal opening(s) 394 and 432 with the space between the outer peripheral wall 428 and the inner wall 32 of the body 24.

The detent protrusion 404 is adapted to project into the slot (of the slots 416–427), which is adjacent to the one slot that is aligned with the slot 402, so as to prevent inadvertent relative movement between the sealing piston 370 and the orifice plate 374.

As noted above, the size of the slots 416–427 in terms of their widths, in circumferential direction, and their depths, in an axial direction, varies from slot to slot so that each slot will accommodate a different rate of fluid flow therethrough. The width of the slots, in a circumferential direction, varies, for example, from a 0.0625 inches in the narrowest slot to 0.340 inches in the widest slot. The depth of the slots 416–427 also varies from for example from 0.004 inches in the shallowest slot (also the narrowest slot) to 0.050 inches in the deepest and widest slot. In sum then, the alignment of the slot 402 with a particular one of the slots 416–427 will determine the rate of flow or the pressure differential across the interim flow path (that is, between the sealing piston 370 and the shaft orifice 374). The rate of flow or pressure drop is proportional to the speed that the shaft 36 and the assembly 364 may move in the compression stroke direction (that is, to the right in FIG. 17). By relating the piston 370, relative to the plate 374, the speed of the shaft and piston assembly may be adjusted. This movement will align the slot 402 with one or another of the slots 416–427 and thus change the rate of flow or pressure differential. As noted above, such relative rotation can be achieved by moving the assembly 364 until the notch 386 on the piston 370 engages the button portion 392 of inner wall 32 of the body 24.

To facilitate adjustment of the speed of the spring 22 and to assure that the spring's user can again, repeatedly, select a particular spring speed, identifying indicia can be applied to the spring. For example, an arrow, which is reflective of the position of the slot 402, can be applied to the outer surface of the tubular body 24 and twelve numbers which are arranged like on the face of a clock and are reflective of the positions of the slots 416–427, to a non-rotating portion of the overall spring mechanism.

Again referring to FIG. 17, a seal assembly 354 is shown at the left hand end of that FIGURE. This seal assembly is of a conventional design and basically performs the same function as the seal assembly 54 shown in FIG. 1. The assembly 354 includes a self retaining bushing 342, a teflon washer 344, a "quad" seal 346, and an O-ring seal 348, and a retainer 350.

The preferred embodiments of the present invention have now been described. These preferred embodiments constitute the best mode contemplated by the inventors for carrying out their present invention. The invention and the manner and process of making and using it have been described, it is believed, in such full, clear, concise and exact terms as to enable a person skilled in this art to make and use the same. Changes can, of course, be made to these preferred embodiments of the invention. Accordingly and because the present invention may be copied without copying the precise details of the preferred embodiments, the following claims particularly point out and distinctly claim the subject matter which the inventors regard as their invention and wish to protect.

We claim:

1. An adjustable speed gas spring adapted for assisting in closing a door in a building where the gas spring velocity in at least one direction determines the closing speed of the door, the gas spring comprising:

a tubular body having an inner wall that defines an elongated fluid chamber therein, the fluid chamber having a first end and a second end and also having a longitudinal axis that extends between the first and second ends, with the first and second ends of the fluid chamber each having normally closed openings therein, with the fluid chamber being filled with at least a first pressurized fluid, and with the second end of the body adapted to be connected with selectively one of the building adjacent to the door and the door;

a shaft having a central axis, a first end and a second end, with the first end of the shaft having a shoulder thereon and extending into the first end of the fluid chamber so that the axes of the fluid chamber and the shaft are coaxial and so that the first end of the shaft may reciprocally move in the fluid chamber parallel to the axis of the fluid chamber, and with the second end of the shaft adapted to be connected with selectively the other of the door or the building adjacent to the door, and with the shoulder being adjacent to the first end of the shaft;

a first piston assembly supported on and about the shaft adjacent the first end of the shaft and serving to separate the fluid chamber into a first sub-chamber that is adjacent the first end of fluid chamber and a second sub-chamber that is adjacent to the second end of the fluid chamber, the first piston assembly including:

(a) a sub-assembly that has a first side facing one end of the fluid chamber, that has a second side facing the other end of the fluid chamber and that has an axial opening through which the first end of the shaft extends;

(b) a first flow path and a second fluid flow path, with a part of both the first and second flow paths being disposed, in part, in the sub-assembly and extending between the first and second sub chambers, and with the first flow path providing less restriction to the flow of fluid than the second flow path;

(c) a first member connected with the first end of the shaft so as to move therewith, with the first member having a first side that faces the one end of the fluid chamber and that is adjacent to the second side of the sub-assembly, with another part of the second flow path being defined between the second side of the sub-assembly and the first side of the first member and with the relative angular positioning of the second side of the sub-assembly and first side of the first member determining the flow area of the other part of the second flow path; and means for permitting the shaft and selectively one of the sub-assembly and the first member to be rotated relative to each about the axis of the shaft such that the relative rotation will cause relative rotational movement between the second side of the sub-assembly and the first side of the first member of the sub-assembly so as to cause the flow area of the other part of the second flow path to be changed.

2. The gas spring of claim 1 wherein a second member is supported on the first end of the shaft adjacent to the first side of the sub-assembly, with the sub-assembly being supported on the shaft between the first and second members, and with the distance between first and second members, parallel to the axis of the shaft, being greater than the distance between the first and second sides of the sub-assembly so that the sub-assembly may move axially, along the axis of the shaft, relative to the first member.

3. The gas spring of claim 2 wherein the second side of the sub-assembly and the first side of the first member are generally parallel to each other and are moved into surface-to-surface contact with each other when the first end of the shaft moves relatively toward the other end of the fluid chamber; wherein the other part of the second flow path includes a groove which is formed in selectively one of the second side of the sub-assembly and the first side of the first member.

4. The gas spring of claim 1 wherein the other part of the second flow path includes a radially extending groove which is formed in selectively one of the second side of the sub-assembly and the first side of the first member; and wherein the first member has an involute-like spiral profile.

5. The gas spring of claim 1 wherein a plurality of angularly spaced slots that are in selectively one of the second side of the sub-assembly and the first side of the first member, with each of the plurality of slots having different flow areas, with the other slot being adopted to be selectively aligned with one of the plurality of slots; wherein another slot is in selectively the other one of the second side of the sub-assembly and the first side of the first member; and wherein the other part of the second flow path includes the other slot and an aligned one of the plurality of slots.

6. The gas spring of claim 5 which includes means for selectively maintaining the other slot aligned with the one of the plurality of slots.

7. The gas spring of claim 5 which includes means for indicating which one of the plurality of slots is aligned with the other slot.

8. In an adjustable speed gas spring which is adapted for assisting in closing a door in a building, including: a tubular body having a first end, a second end, and an inner wall that defines an elongated fluid chamber therein, the fluid chamber having a first end adjacent to the first end of the body, a second end adjacent to the second end of the body, and a longitudinal axis that extends between the first and the second ends of the fluid chamber, with the first and second ends of the fluid chamber each having normally closed openings therein, with the fluid chamber being filled with at least a first fluid, and with the second end of the body adapted to be connected with selectively one of the building adjacent to the door and the door; a shaft having a central longitudinal axis, a first end and a second end, with the first end of the shaft extending into the first end of the fluid chamber so that the axes of the fluid chamber and the shaft are coaxial and so that the first end of the shaft may rotate about its axis in and with respect to the body and may reciprocally move in the fluid chamber parallel to the axis of the fluid chamber, and with the second end of the shaft adapted to be connected with selectively the other of the door or the building adjacent to the door, the improvement comprising: a first piston assembly that permits the speed of the shaft, when moved in at least one axial direction, to be adjusted in that the speed may be selectively increased or decreased, that is supported on and about the shaft adjacent to the first end of the shaft and that serves to separate the fluid chamber into a first sub-chamber which is adjacent the first end of the fluid chamber and a second sub-chamber which is adjacent to the second end of the fluid chamber; first and second fluid flow paths defined in the first piston assembly for permitting fluid to flow between the first and second sub-chambers, with the first flow path being closed when the first piston assembly moves in the one axial direction and being open when the first piston assembly moves in the opposite axial direction; the first piston assembly including a first member that is mounted on the shaft, adjacent to the first end of the shaft, such that the first member moves reciprocally and rotationally with the reciprocal and rotational movement of the shaft and that includes a first side thereon; a second member that is mounted on the shaft, adjacent to the first member, that is adapted to move, in a limited manner, with respect to the first member and the shaft and that includes a second side thereon which faces the first side of the first member, with the first and second sides being adapted to define therebetween an interim fluid flow path that defines at least a part of the second fluid flow path; and means for selectively rotating the first and second members, with respect to each other, to selectively change the interim flow path so as to selectively change the fluid pressure drop across the interim flow path when the first piston assembly moves in the one axial direction.

9. The adjustable speed gas spring of claim 8 wherein when the shaft and first piston assembly are moved in the one axial direction, the first and second sides are maintained adjacent to each other so as to define therebetween the interim fluid flow path; and wherein when the shaft and first piston assembly are moved in the opposite axial direction, the second member is moved axially, with respect to the first member, so that a gap is created between the first and second sides and so as to non-define the interim fluid flow path between the first and second sides.

10. The adjustable speed gas spring of claim 9 wherein the interim fluid flow path includes a groove in selectively one of the first side and the second side; and wherein selectively the other of the first side and the second side includes means for changing the effective flow length of the groove which, in turn, changes the fluid pressure drop across the interim flow path.

11. The adjustable gas spring of claim 10 wherein the first and second sides are generally annular and include central apertures through which the shaft extends; and wherein the groove extends radially from the aperture in the side in which the groove is included.

12. The adjustable gas spring of claim 11 wherein the depth of the groove varies along its length.

13. The adjustable gas spring of claim 10 wherein the means for changing the effective flow length of the groove includes an involute-like shaped member.

14. The adjustable speed gas spring of claim 8 wherein the first and second sides are generally annular and include central apertures through which the shaft extends; wherein the interim fluid flow path includes a plurality of slots that are in selectively one of the first and second sides, that are angularly spaced from each other about the longitudinal axis of the shaft and that selectively define a portion of the interim flow path; wherein each of the plurality of slots differs from the other slots in terms of the fluid pressure drop created by fluid flow therethrough; and wherein selectively the other of the first and second surfaces includes another slot that may selectively be aligned with one of the plurality of slots and that serves as a part of the interim flow path which extends between the periphery of the first and second sides and the central apertures of the first and second sides.

15. The adjustable speed gas spring of claim 8 wherein at least a part of the first flow path is defined between the inner wall of the tubular body and the first piston assembly.

16. The adjustable speed gas spring of claim 8 which includes means for selectively maintaining the other slot aligned with the one of the plurality of slots.

17. The adjustable speed gas spring of claim 8 which includes means for indicating which one of the plurality of slots is aligned with the other slot.

18. An adjustable speed gas spring adapted for assisting in closing a door in a building where the gas spring extension velocity determines the closing speed of the door, the gas spring comprising:

a tubular body having an inner wall that defines an elongated fluid chamber therein, the fluid chamber having a first end and a second end and also having an elongated axis that extends between the first and second ends, with the first and second ends of the fluid chamber each having normally closed openings therein, with the fluid chamber being filled with at least a first pressurized fluid, and with the second end of the body adapted to be connected with selectively one of the building adjacent to the door and the door;

a shaft having a central axis, a shoulder, and first and second ends, with the first end of the shaft extending into the first end of the fluid chamber so that the axes of the fluid chamber and the shaft are coaxial and so that the first end of the shaft may reciprocally move in the fluid chamber parallel to the axis of the fluid chamber, and with the second end of the shaft adapted to be connected with selectively the other of the door or the building adjacent to the door, and with the shoulder being adjacent to the first end of the shaft;

a first piston assembly supported on and about the shaft adjacent the first end of the shaft and serving to separate the fluid chamber into a first sub-chamber that is adjacent the first end of fluid chamber and a second sub-chamber that is adjacent to the second end of the fluid chamber, the first piston assembly including:

(a) a sub-assembly that has a first side facing the first end of the fluid chamber, that has a second side facing the second end of the fluid chamber, that has an axial opening through which the first end of the shaft extends, and that has a portion, between the sides, which sealingly engages the inner wall of the tubular body so as to prevent the flow of fluid between the sub-assembly and the inner wall from the first sub-chamber to the second sub-chamber and visa versa; and (b) a first flow path and a second fluid flow path, with a part of both the first and second flow paths being disposed, in part, in the sub-assembly and extending between the first and second sub-chambers, and with the first flow path providing less restriction to the flow of fluid than the second flow path;

(c) a first member connected with the first end of the shaft so as to move therewith, with the first member having a first side that faces the first end of the fluid chamber and that is adjacent to the second side of the sub-assembly, with the first member, in cooperation with the sub-assembly, serving to restrict flow through the first flow path when the first end of the shaft moves relatively away from the second end of the first chamber and to permit flow through the first flow path when the first end of the shaft moves relatively towards the second end of the fluid chamber, with another part of the second flow path being defined between the second side of the sub-assembly and the first side of the first member and with the relative angular positioning of the second side of the sub-assembly and first side of the first member determining the length of the other part of the second flow path;

(d) a second member supported on the first end of the shaft adjacent to the first side of the sub-assembly so that the second member will limit movement of the sub-assembly, relative to the first end of the shaft, toward the second end of the shaft, with the second member being disposed on the shaft between the shoulder and the first end of the shaft, with the sub-assembly being supported on the shaft between the first and second members, and with the distance between first and second members, parallel to the axis of the shaft, being greater than the distance between the first and second sides of the sub-assembly so that the sub-assembly may move, along the axis of the shaft, relative to the first member; and means for permitting the shaft and the tubular body to be rotated relative to each about the axis of the shaft such that the relative rotation will cause relative rotational movement between the second side of the sub-assembly and the first side of the first member so as to cause the length of the second flow path to be changed.

19. The gas spring of claim 18 wherein the second side of the sub-assembly and the first side of the first member are generally parallel to each other and are moved into surface-to-surface contact with each other when the first end of the shaft moves relatively toward the first end of the fluid chamber; wherein the other part of the second flow path includes a curved groove which is formed in selectively one of the second side of the sub-assembly and the first side of the first member and which is spaced inwardly from their peripheral side edges, and a cut-out which is adjacent to the peripheral side edge of selectively the other of the first side of the first member and the second side of the sub-assembly and which extends inwardly from the peripheral side edge so as to overlie a portion of the groove.

20. The gas spring of claim 19 wherein the first flow path includes a plurality of axially extending passages in and axial through the sub-assembly; wherein the one part of the second flow path includes one of the plurality of the axially extending passages wherein the ends of the axially extending passages, which are adjacent to the second side of the sub-assembly, are blocked by the first side of the first member when the first side of the first member and the second side of the sub-assembly are in surface-to-surface contact; wherein one end of the groove is in fluid communication with the one axially extending passage so as to permit fluid to flow from the one axially extending passage into the groove when the second side of the sub-assembly and the first side of the first member are in surface to surface contact.

21. The gas spring of claim 18 wherein the first flow path includes a plurality of axially extending passages in and axial through the sub-assembly; wherein the one part of the second flow path includes one of the plurality of the axially extending passages; wherein the ends of the axially extending passages, which are adjacent to the second side of the sub-assembly, are blocked by the first side of the first member when the first side of the first member and the second side of the sub-assembly are in surface-to-surface contact; wherein one end of the groove is in fluid communication with the one axially extending passage so as to permit fluid to flow from the one axially extending passage into the groove when the second side of the sub-assembly and the first side of the first member are in surface to surface contact.

* * * * *